Nov. 5, 1968  A. F. MANZ  3,409,756
METAL ARC WORKING
Filed Jan. 27, 1965

INVENTOR.
AUGUST F. MANZ
BY
Thomas J. O'Brien
ATTORNEY

United States Patent Office 3,409,756
Patented Nov. 5, 1968

3,409,756
METAL ARC WORKING
August F. Manz, Union, N.J., assignor to Union Carbide Corporation, a corporation of New York
Filed Jan. 27, 1965, Ser. No. 428,380
5 Claims. (Cl. 219—130)

ABSTRACT OF THE DISCLOSURE

This invention relates to sigma welding in which uniform rippling of the weld is obtained by repeatedly changing the power of the arc while continuously maintaining a spray-type mode of transfer from the electrode to the work to produce better welds of desired bead shape.

---

This invention relates to metal arc working, and more particularly to welding with a consumable metal electrode.

The invention provides for the making of a uniformly rippled weld by energizing from a suitable source of power a spray type transfer metal arc between one end of a consumable metal electrode and work in circuit therewith, as such electrode is fed continuously toward the work, and repeatedly changing the value of power supplied to such arc to change the metal spray between selected high and low values—while continuously maintaining the spray type mode of transfer from such electrode to the work without any interruption in such metal spray transfer.

Thus, the present invention is concerned with spray-transfer type arc welding in which a controlled ripple in the arc power is present and is selectively adjustable to produce better welds of a desired bead shape. This is obtained either by control of the power supply output, or wire feed rate, or both of the latter in combination.

A critical feature of the invention is that metal transfer (welding) is *continuous* during repetitive arc power level changes that are controlled. Advantages include: extension of the useable power range, control of the weld bead shape, and even the production of decorative surface effects—if desired.

Figure 1:
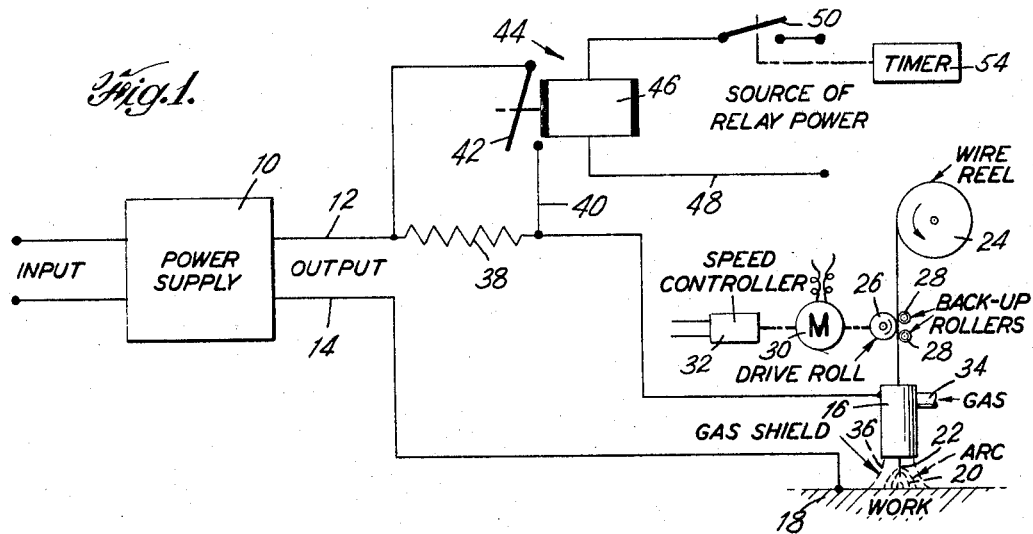
FIGURE 1 is a circuit diagram illustrating the invention.

As shown in FIG. 1, the output of an electrical welding power supply 10 is conducted by leads 12 and 14 to a torch 16 and work 18, so as to energize a spray-type transfer arc 20 between the end of a wire electrode 22 and such work 18. Such electrode 22 is fed continuously toward the arc 20 from a wire reel 24 by a drive roll 26 in cooperation with back-up rollers 28, 28. The drive roll 26 is, in turn, driven by a wire feed motor 30 provided with a speed controller 32. Suitable arc shielding gas, such as argon, is supplied to the torch via inlet 34, and is discharged in a continuous stream 36 from the torch around the end portion of the electrode and arc, as well as over the adjacent weld metal and work to protect the latter from contamination by the ambient atmosphere.

A resistor 38 is connected in series with welding current lead 12. Such resistor 38 is provided with a shunt circuit 40 including a normally open switch 42 of a relay 44, the circuit 48 including a switch 50.

In operation, with switch 50 open, relay switch 42 is open, and arc 20 operates in a normal spray-type manner with relatively low power, because of resistor 38 being in circuit with the arc. When switch 50 is closed, relay coil 46 is energized, closing switch 42, which effectively removes resistor 38 from the circuit. This has the effect of increasing the value of power supplied to the arc 20, changing it to a high power spray arc.

Figures 2A, 2B:
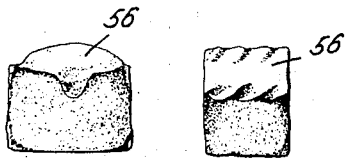
FIGURE 2a is a transverse cross-sectional view of a seam weld made according to the invention.
FIGURE 2b is a longitudinal section of a portion of such weld.
Figure 3A:
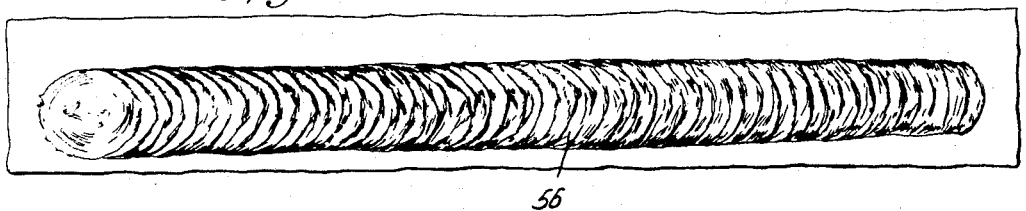
FIGURE 3a is a plan view of a weld bead of the invention.
Figure 3B:
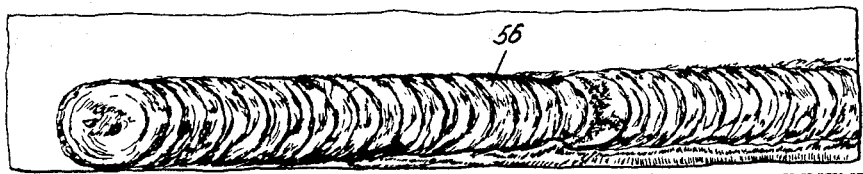
FIGURE 3b is a similar view of a modification.

Switch 50 may be programmed by a controller or timer 54 to open and close such switch in a selected timing sequence, to correspondingly change the arc power between relatively high and low values. FIGS. 2 and 3 show a typical weld made in such manner.

Similarly the wire feed speed may be changed by operation of the speed controller 32 to change the arc spray to alternate between high and low values. Also the timer and speed controller may be operated in unison to obtain a desired weld bead contour. As shown in FIGS. 2 and 3, the weld bead 56 has uniform ripples that are decorative, and the weld is exceptionally sound and well penetrated as shown.

An important feature of the invention is that the spray-type transfer of metal in the arc is continued throughout the operation. This improves the quality of the resulting weld which also has the desired surface contour of ripples, as shown. By adjusting resistance of resistor 38, and/or the frequency of the switching operation, the ripples may be changed in size and/or number, as desired.

In an actual working example of the invention, a $\frac{1}{16}''$ diameter aluminum wire electrode was fed at a rate sufficient to produce a D.C. arc current of about 500 amperes, at an arc voltage of about 27–28 volts, under steady state conditions. The rippled welds 56 were obtained by changing the output power supply characteristic between high and low values of 12,500 and 18,600 watts, respectively, i.e. at a substantially min./max. arc power ratio of 2/3.

In practicing the invention the selected high and low values of arc power, need only different values, provided electrode-to-work short circuiting is avoided.

What is claimed is:

1. Method of consumable metal electrode arc working, which comprises energizing from a suitable source of power a spray-type transfer metal arc between one end of a consumable metal electrode and work in circuit therewith as such electrode is fed continuously toward the work, and periodically varying the value of power supplied to such arc to continuously change the metal spray between selected high and low values such that the spray-type mode of transfer from such electrode to the work is maintained throughout the welding operation.

2. Method as defined by claim 1, in which the variations in power supplied to the arc are accomplished by repeatedly changing the output characteristic of the power supplied to the arc by such source of power.

3. Method as defined by claim 1, in which the variations in power supplied to the arc are accomplished by repeatedly changing the rate at which the consumable metal electrode is continuously fed toward the work.

4. Consumable metal electrode arc welding comprising feeding a metal wire electrode toward metal work to be welded, energizing a welding arc between such work and the end of the so-fed electrode, moving such arc relatively to said work to make a weld bead, and periodically varying the power of such arc between selected values that are different from each other during the progress of such arc in so making the weld bead to produce ripples in such bead, while maintaining a non-short-circuiting type of transfer between the electrode end and the work.

5. Arc welding as defined by claim 4, in which such arc power changes are made by a step selected from the class consisting of changing the characteristic of the power supplied to the arc, changing the electrode feed rate, and changing both the characteristic of the power supplied to the arc and the electrode feed rate.

References Cited

UNITED STATES PATENTS

| | | | |
|---|---|---|---|
| 2,804,575 | 8/1957 | Matulaitis | 219—131 X |
| 3,068,352 | 12/1962 | Correy | 219—137 |
| 3,071,680 | 1/1963 | Anderson et al. | 219—131 |

OTHER REFERENCES

"Control of Transfer in Aluminum Consumable Electrode Welding," Institute of Welding Publication of Conference Paper, Oct. 29–Nov. 2, 1962.

"Programme Controlled Pulsating Arc Welding with a Consumable Electrode," by Paton et al., BWRA translation of "Automatic Welding," No. 1, 1964.

RICHARD M. WOOD, *Primary Examiner.*

B. A. STEIN, *Assistant Examiner.*